US 6,633,730 B2

(12) United States Patent
Ichimiya (10) Patent No.: US 6,633,730 B2
(45) Date of Patent: Oct. 14, 2003

(54) RANGEFINDER DEVICE AND CAMERA INCORPORATING THE SAME

(75) Inventor: Takashi Ichimiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,787

(22) Filed: Aug. 22, 2001

(65) Prior Publication Data

US 2002/0051637 A1 May 2, 2002

(30) Foreign Application Priority Data

Aug. 23, 2000 (JP) ........................................ 2000-252159

(51) Int. Cl.[7] ........................ G03B 3/00; G03B 15/02; G03B 27/40
(52) U.S. Cl. ...................... 396/104; 396/106; 250/201.4
(58) Field of Search ................................. 396/104, 106, 396/89, 120, 126; 250/201.4

(56) References Cited

U.S. PATENT DOCUMENTS 5,361,118 A * 11/1994 Taka et al. ................ 250/201.4
5,870,178 A * 2/1999 Egawa et al. ............... 356/3.03

OTHER PUBLICATIONS

Japanese Patent Laid–Open Publication (Kokai) No. 06–051191, published Feb. 25, 1994.
Japanese Patent Laid–Open Publication (Kokai) No. 08–219772, published Aug. 30, 1996.

* cited by examiner

Primary Examiner—Russell Adams
Assistant Examiner—Arthur A Smith
(74) Attorney, Agent, or Firm—Robin, Blecker & Daley (57) ABSTRACT

There are provided a rangefinder device which is capable of detecting that improper distance measurement through glass or the like has been performed, even when the glass is positioned at a certain or considerable distance from the camera, and a camera incorporating the rangefinder device. A projecting section projects a signal beam towards a photographic subject, and a light receiving section receives light from the photographic subject due to the projection via two different light paths. A distance information calculating circuit calculates distance information related to a distance to the photographic subject from the positional relationship between images received by the light receiving section. A position calculating circuit calculates first position information related to positions of the images received by the light receiving section based upon the calculated distance information. A determination circuit determines whether the calculated distance information is proper or improper, from the relationship between the first position information calculated by the position calculating circuit and second position information related to light receiving positions of the images that is obtained based upon an output from the light receiving section.

12 Claims, 7 Drawing Sheets

RANGEFINDER DEVICE AND CAMERA INCORPORATING THE SAME

BACKGROUND OF THE INVENTION

1. Field of the Invention

The present invention relates to a rangefinder device for use in an auto-focus camera or the like, and more particularly to improvements in or to a rangefinder device having a function of detecting that improper distance measurement through glass or the like has been performed, and a camera that incorporates such a rangefinder device.

2. Description of the Related Art

In a conventional active type rangefinder device, a signal beam is projected towards an object whose range is to be determined (the "target object") by a projecting section, the reflected light therefrom is received by a light receiving section which is arranged at a specified distance corresponding to a base length from the projecting section, and the distance to the target object is calculated from the light receiving position (the reflected spot position).

However, if glass is present between the photographic subject and the camera, a reflected signal beam is generated by the surface of the glass, so that it has been difficult to focus upon a photographic subject on the other side of a glass barrier.

Moreover, as a countermeasure when performing photography through glass with a conventional active type rangefinder device, there have been proposed a method of determing that photography is being performed through glass if a light reception output is obtained when distance measurement is carried out with a combination of of light projection/reception elements different from a regular combination of light projection/reception elements by using an active multi-point type rangefinder device, as disclosed in Japanese Laid-Open Patent Publication (Kokai) No. 6-51191, and a method in which the presence of glass is detected from the value of the amount of received light and depending upon whether a ranging output falls within a ranging interlock range, as disclosed in Japanese Laid-Open Patent Publication (Kokai) No. 8-219772, for example.

However, with the active type range finders described in the above-mentioned Japanese Laid-Open Patent Publications (Kokai) Nos. 6-51191 and 8-219772, it is only possible to determine upon the presence of glass only in such a case where the glass is at a very close distance. In other words, there has been the problem that it has not been possible to make a correct determination if the glass is positioned at a certain or considerable distance from the camera, and regular reflected light of an IRED reflected from the glass is incident upon the light receiving element.

SUMMARY OF THE INVENTION

It is an object of the present invention to provide a rangefinder device which is capable of detecting that improper distance measurement through glass or the like has been performed, even when the glass is positioned at a certain or considerable distance from the camera, and a camera incorporating the rangefinder device.

To attain the above object, a first aspect of the present invention provides a rangefinder device, comprising a projecting section that projects a signal beam towards a photographic subject, a light receiving section that receives light from the photographic subject due to the projection via two different light paths, a distance information calculating circuit that calculates distance information related to a distance to the photographic subject from a positional relationship between images received by the light receiving section, a position calculating circuit that calculates first position information related to positions of the images received by the light receiving section based upon the calculated distance information, and a determination circuit that determines whether the calculated distance information is proper or improper, from a relationship between the first position information calculated by the position calculating circuit and second position information related to light receiving positions of the images that is obtained based upon an output from the light receiving section.

Preferably, the light receiving section has a first light reception range and a second light reception range that is separated by a predetermined base length from the first light reception range, and the light receiving section receives light from the photographic subject at the two light reception ranges at angles corresponding to the distance to the photographic subject.

Preferably, the rangefinder device according to the present invention comprises a position detecting circuit that detects the second position information related to the light receiving positions of the images that is obtained based upon the output from the light receiving section.

In a preferred form of the present invention, the determination circuit determines that the calculated distance information is proper when a degree of agreement between the first position information and the second position is higher than a predetermined value, and that the calculated distance information is improper when the degree of agreement is lower than the predetermined value.

Preferably, the rangefinder device according to the present invention comprises a distance determining circuit operable when the calculated distance information is determined to be improper, for setting the distance to the photographic object calculated by the distance information calculating circuit based upon light from the photographic subject received by the light receiving section in a state with projection operation not being performed by the projecting section, as an effective result of distance measurement. Alternatively, the distance determining circuit may designate a predetermined distance value for the distance to the photographic subject when the calculated distance information is determined to be improper.

To attain the above objective, a second aspect of the present invention further provides a camera having a rangefinder device comprising a projecting section that projects a signal beam towards a photographic subject, a light receiving section that receives light from the photographic subject due to the projection via two different light paths, a distance information calculating circuit that calculates distance information related to a distance to the photographic subject from a positional relationship between images received by the light receiving section, a position calculating circuit that calculates first position information related to positions of the images received by the light receiving section based upon the calculated distance information, and a determination circuit that determines whether the calculated distance information is proper or improper, from a relationship between the first position information calculated by the position calculating circuit and second position information related to light receiving positions of the images that is obtained based upon an output from the light receiving section.

To attain the above object, a third aspect of the present invention also provides a rangefinder device for use in a camera, comprising a projecting section that projects a signal beam towards a photographic subject, first and second light receiving sections that each receive light from the photographic subject, a distance information calculating circuit that calculates distance information related to a distance to the photographic subject from a phase difference between light receiving positions of images obtained by the first and second light receiving sections, a light receiving position detecting circuit that detects light receiving positions of the images obtained by the first and second light receiving sections, and a determination circuit that calculates light receiving positions from the distance information calculated by the distance information calculating circuit, and compares the calculated light receiving positions with the light receiving positions detected by the light receiving position detecting circuit, to thereby determine whether reflected light from a substance that is transparent to light has been received by the first and second light receiving sections.

The above and other objects, features and advantages of the present invention will become more apparent from the following detailed description taken in conjunction with the accompanying drawings.

DESCRIPTION OF PREFERRED EMBODIMENTS

The present invention will now be described in detail with reference to the drawings showing preferred embodiments thereof.

Figure 1:
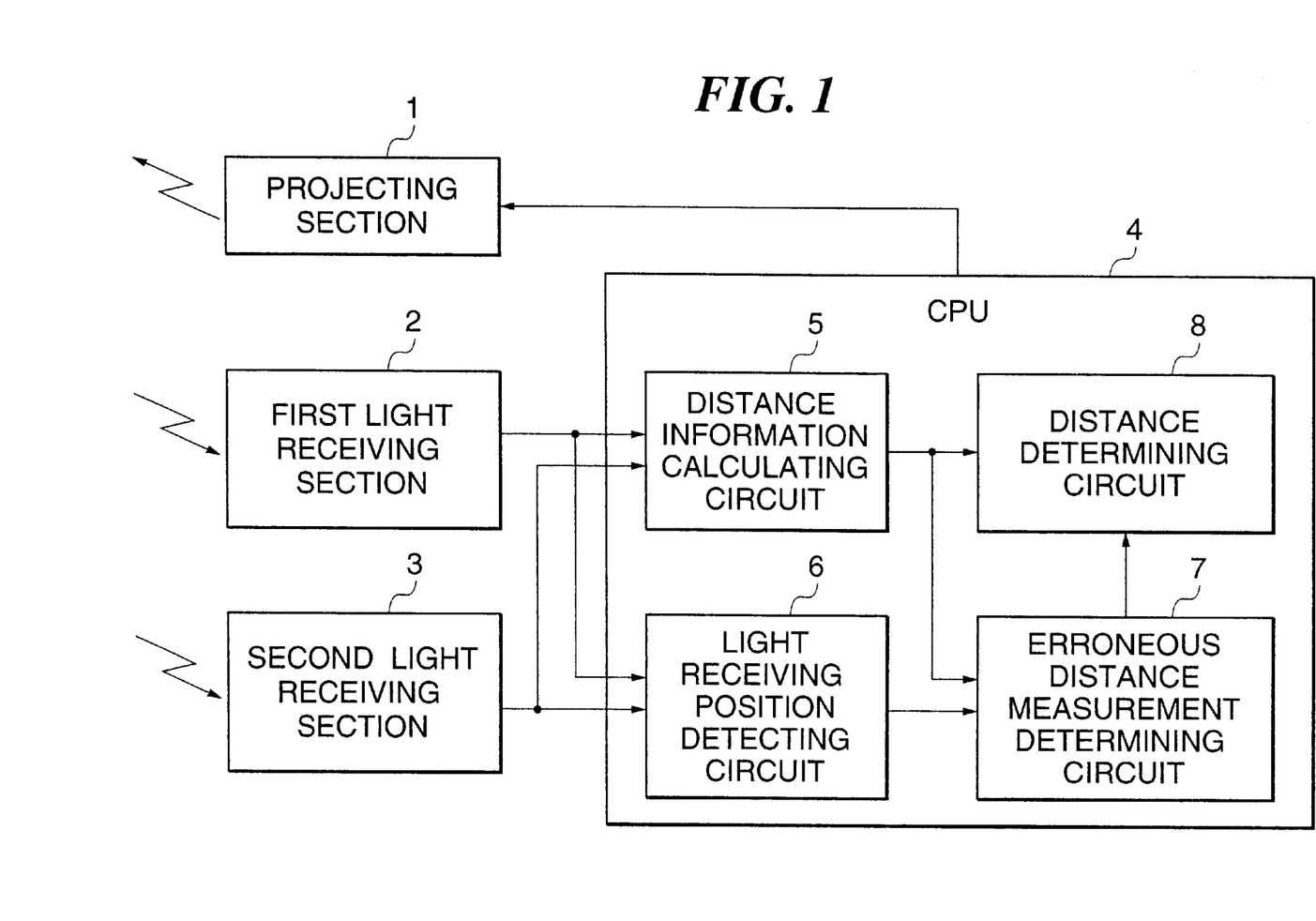
FIG. 1 is a block diagram showing the overall construction of a rangefinder device for a camera according to a first embodiment of the present invention.

FIG. 1 is a block diagram showing the structure of a rangefinder device of a camera according to a first embodiment of the present invention.

In FIG. 1, reference numeral 1 denotes a projecting section which emits a signal beam in the direction of a photographic subject, not shown in the figure, the operation of which is controlled by a CPU that will be described hereinafter.

Reference numeral 2 denotes a first light receiving section, and 3 denotes a second light receiving section, which output information (image signals) relating to light from the signal beam from the projecting section 1 which has illuminated the photographic subject and has been reflected to a distance information calculating section 5 and a light receiving position detecting circuit 6 within the CPU which will be described hereinafter. Reference numeral 4 denotes the CPU, in which are provided the distance information calculating circuit 5, the light receiving position detecting circuit 6, an erroneous distance measurement determining circuit 7, and a distance determining circuit 8.

With the above construction, the projecting section 1 is driven and controlled by the CPU 4 to emit a signal beam in the direction of the photographic subject, not shown in the figure. A portion of the light in this signal beam from the projecting section 1 is reflected from the photographic subject and is incident upon the first light receiving section 2 and the second light receiving section 3, whereby the sections 2, 3 output information (image signals) relating to the images received thereby to the distance information calculating section 5 and the light receiving position detecting circuit 6 in the CPU 4.

The distance information calculating circuit 5 calculates the distance to the photographic subject by calculating the phase difference between images represented by the image signals which are outputted from the first light receiving section 2 and the second light receiving section 3.

On the other hand, the light receiving position detecting circuit 6 detects the respective light receiving positions of the images represented by the image signals which have been outputted from the first light receiving section 2 and the second light receiving section 3.

The erroneous distance measurement determining circuit 7 determines from the outputs of the distance information calculating circuit 5 and this light receiving position detecting circuit 6 whether or not the distance information has been influenced at this time by reflected light from glass.

If it has been determined by the erroneous distance measurement determining circuit 7 that the distance information has been influenced by reflected light from glass, the distance determining circuit 8 performs processing for locking the photographer from carrying out a shutter release and for setting the distance to a far distance.

On the other hand, if it has been determined by the erroneous distance measurement determining circuit 7 that the distance information has not been influenced by reflected light from glass, then the distance determining circuit 8 determines an output value from the distance information calculating circuit 5 as the distance to the subject.

In this manner, the erroneous distance measurement determining circuit 7 can determine, from the distance information and the light receiving positions, whether or not the distance measurement has been influenced by the presence of glass.

The reason why it is possible to determine the presence of glass with the construction shown in FIG. 1 will now be explained with reference to FIG. 2.

Figure 2:
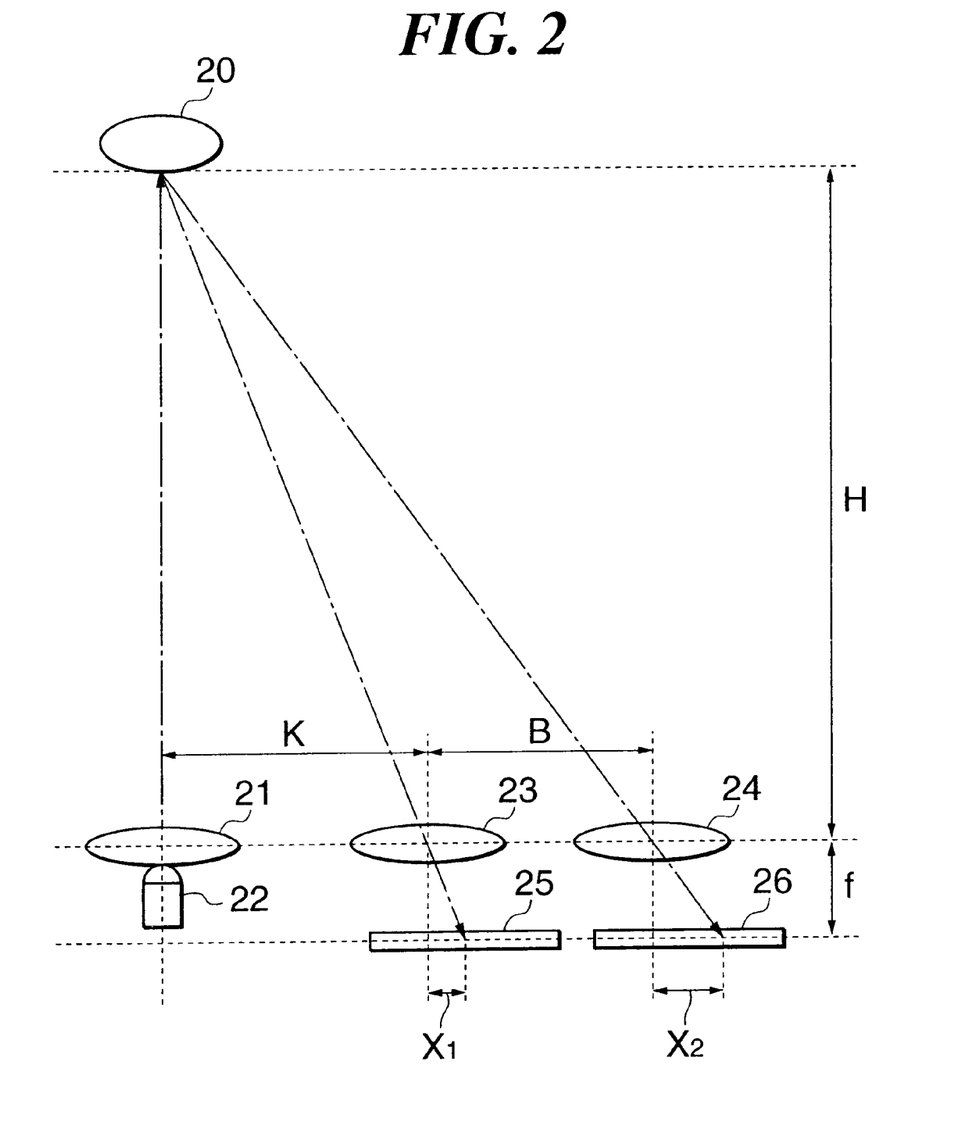
FIG. 2 is a view useful in explaining an operation of distance measurement carried out by the rangefinder device of FIG. 1.

FIG. 2 shows an active type phase difference rangefinder device having two CCD line sensors arranged side by side. The relationship between the measured result for the distance to the photographic subject and the positions of light reception upon the CCDs will now be explained in a case wherein no glass is present between the photographic subject and the rangefinder device.

In FIG. 2, reference numeral 22 denotes an IRED which is a light projection element, and 21 denotes a projection lens. The IRED 22 and the projection lens 21 cooperate to constitute the projecting section 1 of FIG. 1. Reference 20 denotes the photographic subject. Reference numeral 25 denotes a first light reception element CCD(L), while reference numeral 26 denotes a second light reception element CCD(R). Reference numerals 23 and 24 denote light receiving lenses which are arranged side by side, spaced apart by a fixed base length B, with the projection lens 21 and the light receiving lens 23 being spaced apart by a fixed distance K.

In the figure, the distance from the principal points of the light receiving lenses 23 and 24 to the CCDs 25 and 26 respectively is designated by f, while the distance from the principal points of the light receiving lenses 23 and 24 to the photographic subject 20 is designated by H.

Further, assuming that the distance by which a received light image moves from a central position of reflected light observed when the subject 20 is located at a point at infinity and if reflected light therefrom is collected by the light receiving lens 23 and then formed into an image on the CCD 25, to a central position of reflected light observed when the subject 20 is located at the above distance H and if reflected light therefrom is collected by the light receiving lens 23 and then formed into an image on the CCD 25 is defined as $X_1$, and the distance by which the received light image moves from a central position of reflected light observed when the subject 20 is located at the point at infinity and if reflected light therefrom is collected by the light receiving lens 24 and then formed into an image on the CCD 26, to a central position of reflected light observed when the subject 20 is located at the above distance H and if reflected light therefrom is collected by the light receiving lens 24 and then formed into an image on the CCD 26 is defined as $X_2$, the following relationship is established:

$$H=(B \times f)/(X_2-X_1) \quad (1)$$

By determining the correlation between the received light images obtained by the CCDs 25 and 26 and thereby determining the denominator $(X_2-X_1)$ on the right side of the above Equation (1) using a known circuit, the distance to the subject 20 can be calculated. Alternatively, the positions of the received light images at the CCDs may be determined separately to determine $(X_2-X_1)$ from the difference between the positions.

The image moving amounts $X_1$, $X_2$ and the distance H are in the following relationship:

$$X_1=(K \times f)/H \quad (2)$$

$$X_2=\{(K+B) \times f\}/H \quad (3)$$

Figure 3:
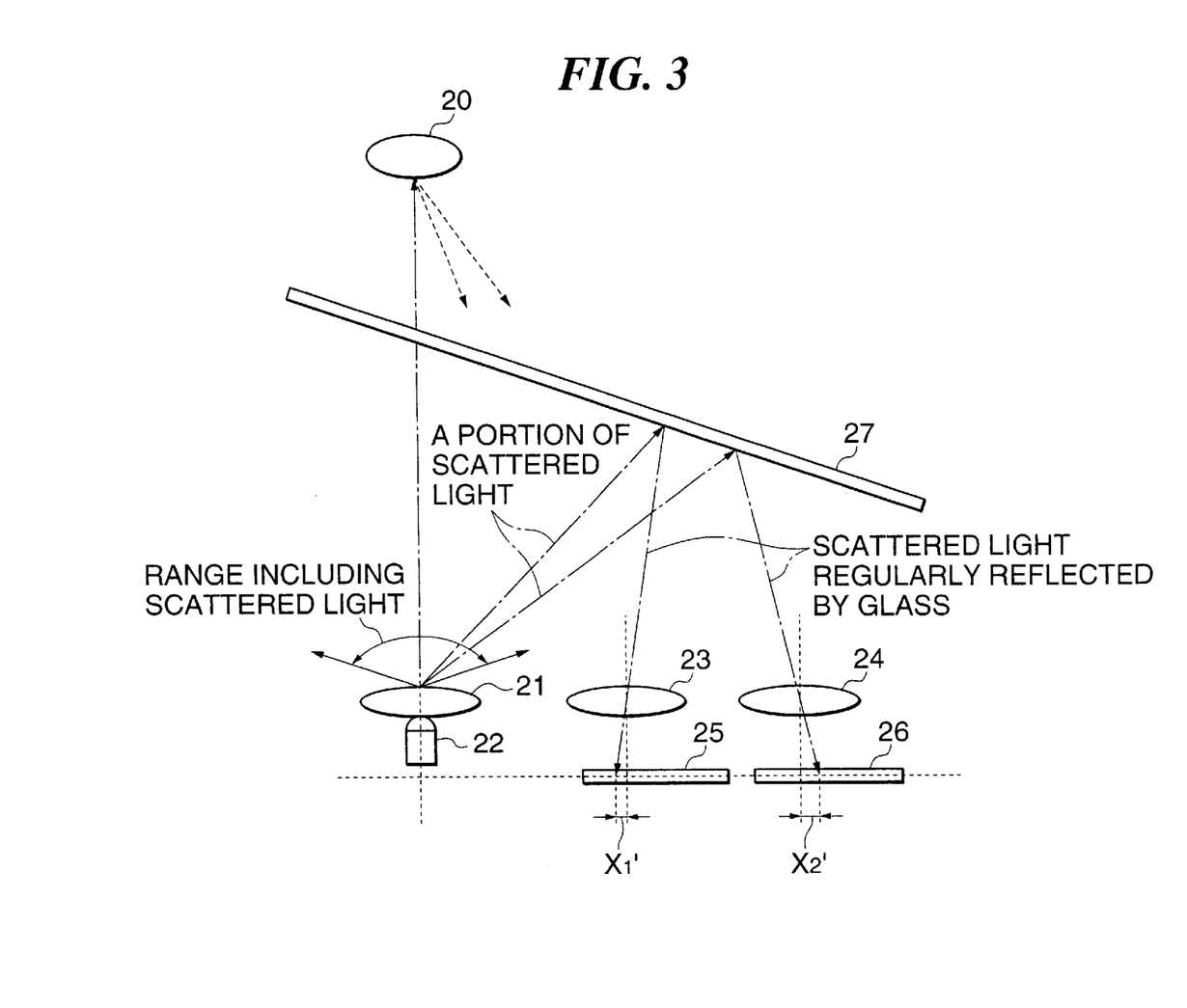
FIG. 3 is a view useful in explaining how the presence of glass is detected by the rangefinder device of FIG. 1.

FIG. 3 shows an active type phase difference rangefinder device which has two CCD line sensors arranged side by side like the one of FIG. 2, but is different from the latter in that a sheet or pane of glass 27 is present between the photographic subject and the rangefinder device.

Generally, scattered light is present in the vicinity of the reflected signal beam, and such scattered light is considered to be caused by scattering of the light by the projection lens or by inner surfaces of the projecting section, not shown in the figures. This scattered light does not exert any influence upon normal distance measurement as shown in FIG. 2, while in the case of distance measurement through glass with a sheet of glass intervening between the subject and the rangefinder device as shown in FIG. 3, the scattered light is reflected back from the glass pane 27. Although this scattered light reflected back from the glass pane 27 is only a few percent of the total amount of light that is emitted from the projecting section 1, the reflection back from the glass pane 27 is regular reflection, and moreover, with distance measurement through glass, the glass sheet 27 is positioned closer than the subject 20, and accordingly the amount of scattered light is greater than the amount of light reflected from the suject. Furthermore, since with distance measurement through glass the light is received from an unanticipated direction, the moving amounts $X_1'$ and $X_2'$ of the received light images do not satisfy the relationships given by the above Equations (1), (2), and (3).

Accordingly, there is no agreement between the result H calculated by Equation (1) from $X_1'$ and $X_2'$ obtained from the correlation of the light received images, the positions $X_1'$ and $X_2'$ of the received light images obtained by the Equations (2) and (3) based upon this value of H, and the positions $X_1'$ and $X_2'$ obtained from the correlation.

To solve this problem, according to the present invention, distance information is derived using Equation (1) from the correlation amount difference of the received light images obtained by the CCD 25 and the CCD 26 by the known circuit. Next, the received light image moving amounts are obtained using Equations (2) and (3) from this distance information, to thereby calculate light receiving positions upon the CCD 25 and the CCD 26. Then, the relationships between the calculated light receiving positions and the actual light receiving positions upon the CCD 25 and the CCD 26 are compared.

The actual light receiving positions upon the CCDs may be detected by obtaining the center of gravity positions of the received light images, or by obtaining the peak positions of the received light images.

If the result of the comparison shows that the calculated light receiving positions and the actual light receiving positions upon the CCD 25 and the CCD 26 almost agree with one another, it is decided that no influence due to the presence of glass is being exerted upon the distance measurement information; while, on the other hand, if the calculated light receiving positions and the actual light receiving positions upon the CCD 25 and the CCD 26 does not agree with or differ from one another, it is decided that the distance measurement information is being influenced by the presence of glass.

Figure 4:
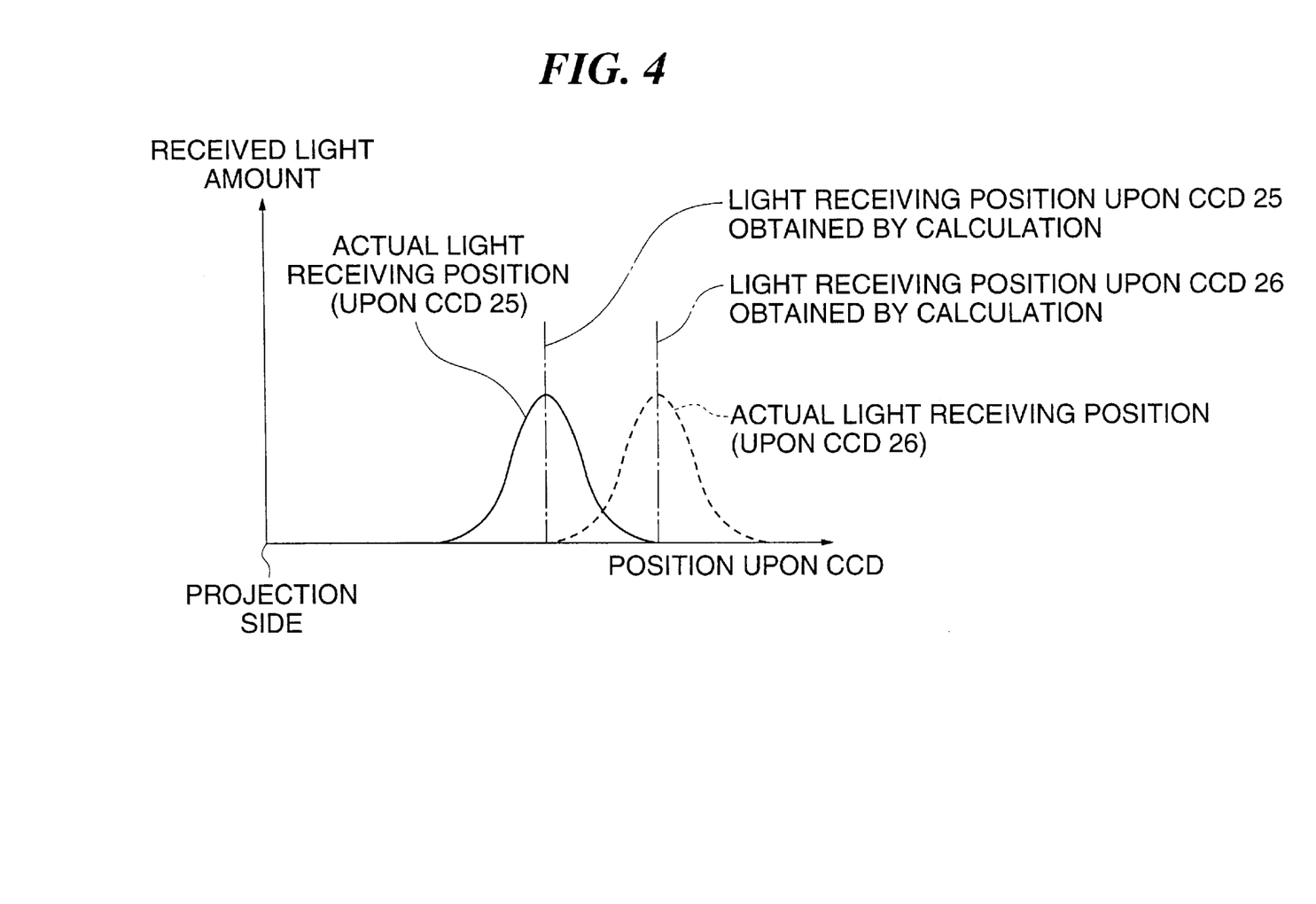
FIG. 4 is a view showing results of a comparison, in the FIG. 2 operation, between light receiving positions obtained by calculation using formulas and actual light receiving positions.

In the case of the FIG. 2 situation, the relationship between the light receiving positions obtained by distance calculation and the actual light receiving positions is as shown in FIG. 4, with the respective light receiving positions which have been calculated using Equations (2) and (3) from the distance information and the actual light receiving positions upon the CCD 25 and the CCD 26 being shown in FIG. 4.

It should be noted that in the case of the situation of FIG. 4, the calculated light receiving positions and the actual light receiving positions upon the CCD 25 and the CCD 26 agree with one another, and hence it is possible to decide that no influence is being exerted upon the distance measurement information by the presence of glass.

Figure 5:
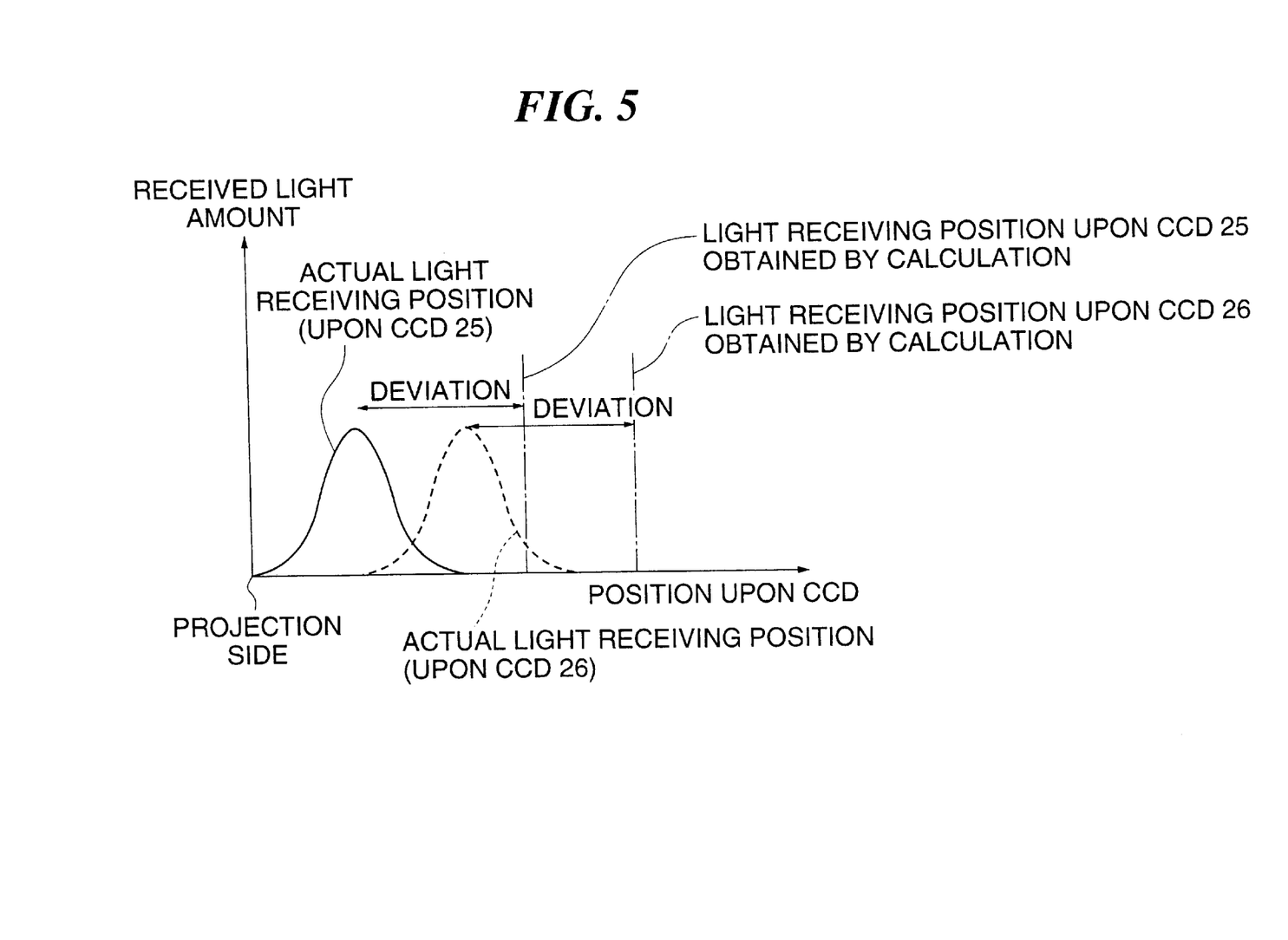
FIG. 5 is a view showing results of a comparison, in the FIG. 3 method, between light receiving positions obtained using formulas and actual light receiving positions.

Furthermore, in the case of the FIG. 3 situation, the respective light receiving positions which have been calculated using Equations (2) and (3) from the distance information and the actual light receiving positions upon the CCD 25 and the CCD 26 are shown in FIG. 5. It should be noted that in the FIG. 5 case, there are certain deviations between the calculated light receiving positions and the actual light receiving positions upon the CCD 25 and the CCD 26, and hence it is possible to decide that an influence is being exerted upon the distance measurement information by the presence of glass.

In this manner, it is possible to determine, from and the distance information and the light receiving positions, whether or not the distance measurement is being performed through glass.

Figure 6:
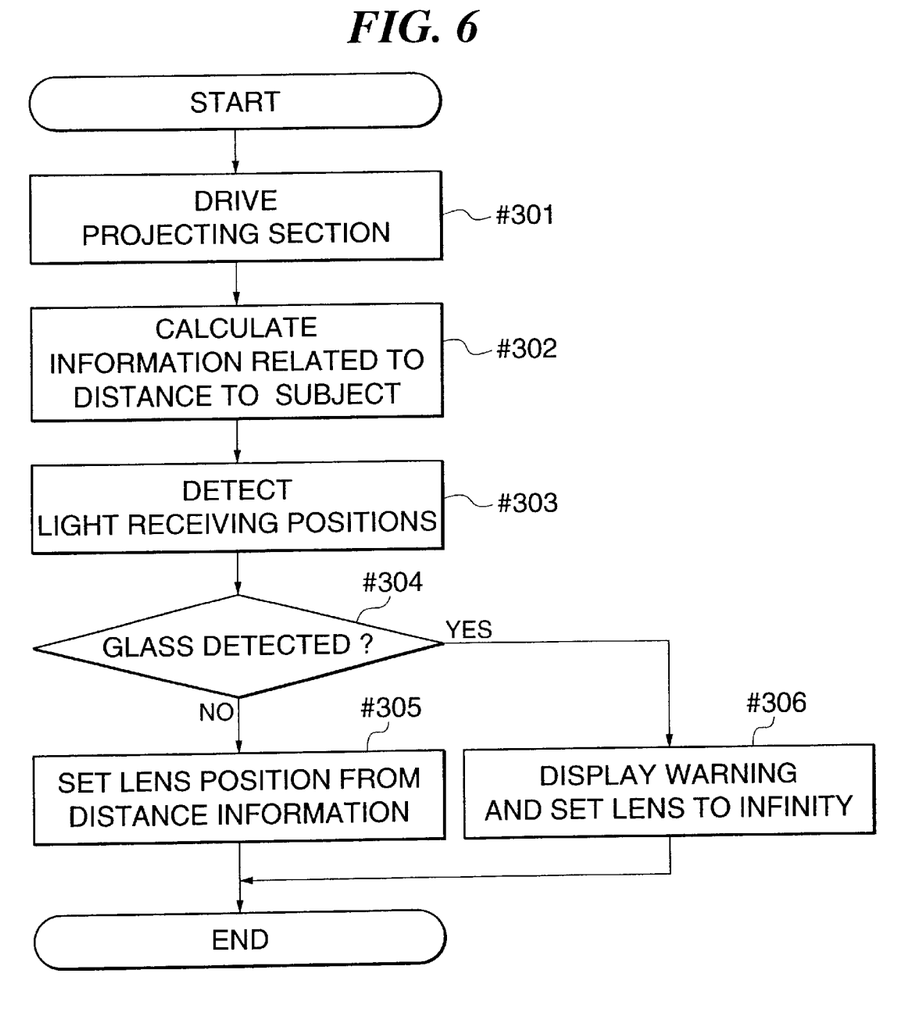
FIG. 6 is a flow chart showing the operation of distance measurement with a camera according to the first embodiment of the present invention.

Next, the actual operation of distance measurement by the construction of FIG. 1 will be explained using a flow chart of FIG. 6.

In a step #301, the projecting section 1 is driven by the CPU 4 in FIG. 1.

Next, in a step #302, the information relating to the distance to the photographic subject is calculated from the phase difference between the received light images which have been obtained by the first light receiving section 2 and the second light receiving section 3. (The distance is obtained using the above Equation (1)).

Next, in a step #303, the actual light receiving positions are detected by the light receiving position detecting circuit 6 from the light receiving positions which have been obtained by the first light receiving section 2 and the second light receiving section 3.

In a step #304, the erroneous distance measurement determining circuit 7 calculates the light receiving positions upon the first light receiving section 2 and the second light receiving section 3 from the distance information which was obtained in the step #302, using the above Equations (2) and (3). The results of calculation of these light receiving positions are compared with the actual light receiving positions which have been detected in the step #303, and if they agree with one another or if their difference is small, then it is decided that the measurement of distance has not been carried out through glass, and the flow of control proceeds to a next step #305. The comparison at the step S304 is carried out by determining whether the difference between the calculated light receiving positions and the detected actual light receiving positions exceeds a predetermined value.

In the step #305, the distance determining circuit 8 determines the distance to the subject as being the distance information which was obtained in the step #302, and sets the lens position according to the determined distance, thereby completing this distance measurement operation.

On the other hand, if the comparison in the step #304 of the results in the step #302 of calculating the light receiving positions and the actual light receiving positions which were detected in the step #303 results in the decision that they do not agree with one another, or that their difference is large, then it is decided that the measurement of distance has been carried out through glass, and the flow of control proceeds to a step #306.

In the step #306, exception processing different from the normal processing for a normal distance measurement result, such as issuing a warning to the photographer and/or locking the shutter release, or setting the lens to infinity as the distance to the subject by the distance determining circuit 8, thus completing the distance measurement.

Figure 7:
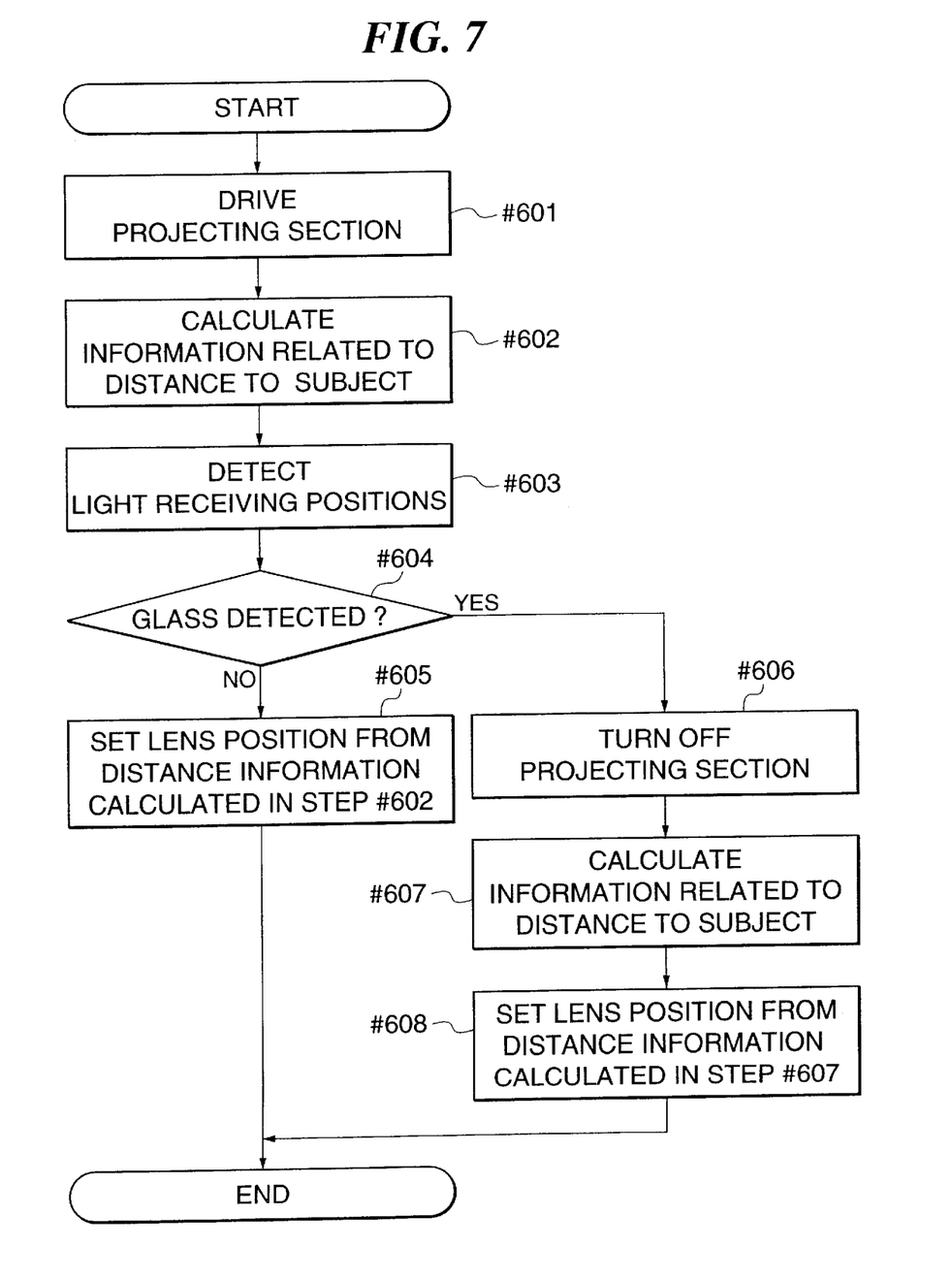
FIG. 7 is a flow chart showing the operation of distance measurement with a camera according to a second embodiment of the present invention.

Next, a second preferred embodiment of the present invention will be described in detail with reference to FIG. 7.

The FIG. 1 block diagram also represents the construction of the rangefinder device for a camera according to this second embodiment of the present invention. Furthermore, the same method is used for determining the presence of glass as was used in the first embodiment.

The operation of distance measurement in this second embodiment will be explained using the FIG. 7 flow chart.

In a step #601, the projecting section 1 is driven by the CPU 4 in FIG. 1.

Next, in a step #602, the information relating to the distance to the photographic subject is calculated from the phase difference between the received light images which have been obtained by the first light receiving section 2 and the second light receiving section 3. (The distance is obtained using the above Equation (1)).

Next, in a step #603, the actual light receiving positions are detected by the light receiving position detecting circuit 6 from the light receiving positions which have been obtained by the first light receiving section 2 and the second light receiving section 3.

In a step #604, the erroneous distance measurement determining circuit 7 calculates the light receiving positions upon the first light receiving section 2 and the second light receiving section 3 from the distance information which was obtained in the step #602, using the above Equations (2) and (3). The results of calculation of these light receiving positions are compared with the actual light receiving positions which have been detected in the step #603, and if they agree with one another or if their difference is small, then it is decided that the measurement of distance has not been carried out through glass, and the flow of control proceeds to a next step #605. The comparison at the step S604 is carried out by determining whether the difference between the calculated light receiving positions and the detected actual light receiving positions exceeds a predetermined value.

In the step #605, the distance determining circuit 8 determines the distance to the photographic subject as being the distance information which was obtained in the step #602, and sets the lens position according to the determined distance, thereby completing this distance measurement operation.

On the other hand, if the comparison in the step #604 of the results in the step #602 of calculating the light receiving positions and the actual light receiving positions which were detected in the step #603 results in the decision that they do not agree with one another, or that their difference is large, then it is decided that the measurement of distance has been carried out through glass, and the flow of control proceeds to a step #606.

In the step #606, the projecting section 1 is turned off by the CPU 4 in FIG. 1, and then the flow of control proceeds to a next step #607.

In the step #607, the information relating to the distance to the subject is calculated from the phase difference between the received light images which have been obtained by the first light receiving section 2 and the second light receiving section 3. In other words, so-called passive AF is executed, and then the flow of control proceeds to a next step #608.

In the step #608, the distance determining circuit 8 determines the distance to the subject as being the distance information which was obtained in the step #607, and sets the lens position according to the determined distance, thereby completing this distance measurement operation.

It should be understood that, in this second embodiment, although the value of $(X_2-X_1)$ was obtained by correlation calculation using Equation (1), as an alternative, the light receiving positions may be determined individually by obtaining the center of gravity positions of the received light images or by obtaining the peak positions of the received light images or the like, and calculating $X_1$ and $X_2$ from these light receiving positions, so as to obtain the distance from Equation (1). In this case, the detection of the light receiving positions performed in the step #303 of the first embodiment or in the step #603 of the second embodiment is omitted, and the relationships (agreement or non-agreement) between the light receiving positions which have been obtained as data in the distance calculation, and the positions as obtained by Equations (2) and (3) may be compared with one another.

Furthermore, as the above comparison procedure for determining agreement or non-agreement, comparison between the values $X_1$ and $X_2$ from Equations (2) and (3) and the actual light receiving positions $X_1$ and $X_2$ which have been obtained by detection may be performed, or comparison between the value $X_1$ from Equation (2) and the actually detected light receiving position $X_1$ may be performed.

Yet further, although in the above described first and second embodiments of the present invention CCD line sensors are used as light receiving sections, it would also be possible to perform the same operation by using light receiving sections which are able to detect the light receiving positions, such as PSDs or other multi-segment type sensors.

Although the first and second preferred embodiments of the present invention employ a single-point type rangefinder device, the present invention could also be applied to a multi-point type rangefinder device.

What is claimed is:

1. A rangefinder device, comprising:
    a projecting section that projects a signal beam towards a photographic subject;
    a light receiving section that has two light receiving lenses, and that receives light from the photographic subject due to the projection through said two light receiving lenses;
    a distance information calculating circuit that calculates distance information related to a distance to said photographic subject from a positional relationship between images received by said light receiving section;
    a position calculating circuit that calculates first position information related to positions of the images received by said light receiving section based upon the calculated distance information; and
    a determination circuit that determines whether the calculated distance information is proper or improper, from a relationship between the first position information calculated by said position calculating circuit and second position information related to light receiving positions of the images that is obtained based upon an output from said light receiving section.

2. A rangefinder device according to claim 1, wherein said light receiving section has a first light reception range and a second light reception range that is separated by a predetermined base length from said first light reception range, and said light receiving section receives light from the photographic subject at said two light reception ranges at angles corresponding to the distance to the photographic subject.

3. A rangefinder device according to claim 1, comprising a position detecting circuit that detects the second position information related to the light receiving positions of the images that is obtained based upon the output from said light receiving section.

4. A rangefinder device according to any of claims 1, 2, or 3, wherein said determination circuit determines that the calculated distance information is proper when a degree of agreement between the first position information and the second position is higher than a predetermined value, and that the calculated distance information is improper when the degree of agreement is lower than the predetermined value.

5. A rangefinder device according to claims 1 or 2, comprising a distance determining circuit operable when the calculated distance information is determined to be improper, for setting the distance to the photographic object calculated by said distance information calculating circuit based upon light from the photographic subject received by said light receiving section in a state with projection operation not being performed by said projecting section, as an effective result of distance measurement.

6. A camera having a rangefinder device comprising:
    a projecting section that projects a signal beam towards a photographic subject;
    a light receiving section that has two light receiving lenses, and that receives light from the photographic subject due to the projection through said two light receiving lenses;
    a distance information calculating circuit that calculates distance information related to a distance to said photographic subject from a positional relationship between images received by said light receiving section;
    a position calculating circuit that calculates first position information related to positions of the images received by said light receiving section based upon the calculated distance information; and
    a determination circuit that determines whether the calculated distance information is proper or improper, from a relationship between the first position information calculated by said position calculating circuit and second position information related to light receiving positions of the images that is obtained based upon an output from said light receiving section.

7. A camera having a rangefinder device according to claim 6, wherein said light receiving section has a first light reception range and a second light reception range that is separated by a predetermined base length from said first light reception range, and said light receiving section receives light from the photographic subject at said two light reception ranges at angles corresponding to the distance to the photographic subject.

8. A camera having a rangefinder device according to claim 6 or 7, comprising a position detecting circuit that detects the second position information related to the light receiving positions of the images that is obtained based upon the output from said light receiving section.

9. A camera having a rangefinder device according to any of claim 6, wherein said determination circuit determines that the calculated distance information is proper when a degree of agreement between the first position information and the second position is higher than a predetermined value, and that the calculated distance information is improper when the degree of agreement is lower than the predetermined value.

10. A camera having a rangefinder device according to any of claim 6, comprising a distance determining circuit operable when the calculated distance information is determined to be improper, for setting the distance to the photographic object calculated by said distance information calculating circuit based upon light from the photographic subject received by said light receiving section in a state with projection operation not being performed by said projecting section, as an effective result of distance measurement.

11. A camera having a rangefinder device according to any of claim 6, comprising a distance determining circuit operable when the calculated distance information is determined to be improper, for designating a predetermined distance value for the distance to the photographic subject.

12. A rangefinder device for use in a camera, comprising:

a projecting section that projects a signal bean, towards a photographic subject;

first and second light receiving sections that each have a light receiving lens, and that each receive light from said photographic subject through said light receiving lens;

a distance information calculating circuit that calculates distance information related to a distance to the photographic subject from a phase difference between light receiving positions of images obtained by said first and second light receiving sections;

a light receiving position detecting circuit that detects light receiving positions of the images obtained by said first and second light receiving sections; and a determination circuit that calculates light receiving positions from the distance information calculated by said distance information calculating circuit, and compares the calculated light receiving positions with the light receiving positions detected by said light receiving position detecting circuit, to thereby determine whether reflected light from a substance that is transparent to light has been received by said first and second light receiving sections.

* * * * *

UNITED STATES PATENT AND TRADEMARK OFFICE
CERTIFICATE OF CORRECTION

PATENT NO. : 6,633,730 B2
DATED : October 14, 2003
INVENTOR(S) : Takashi Ichimiya

It is certified that error appears in the above-identified patent and that said Letters Patent is hereby corrected as shown below:

<u>Column 10,</u>
Line 50, delete "claim 6" and insert -- claim 6, 7 or 8 --.
Line 59, delete "claim 6," and insert -- claim 6 to 9, --.

<u>Column 11,</u>
Line 2, delete "claim 6," and insert -- claim 6 to 9, --.

Signed and Sealed this

Thirty-first Day of August, 2004

JON W. DUDAS
*Director of the United States Patent and Trademark Office*